(12) United States Patent
Truncale et al.

(10) Patent No.: US 9,786,204 B2
(45) Date of Patent: Oct. 10, 2017

(54) VISUALIZING SOUND WITH AN ELECTRO-OPTICAL EARDRUM

(71) Applicant: The University of Scranton, Scranton, PA (US)

(72) Inventors: Nicholas P. Truncale, Scranton, PA (US); Michelle Graham, Succasunna, NJ (US)

(73) Assignee: The University of Scranton, Scranton, PA (US)

( * ) Notice: Subject to any disclaimer, the term of this patent is extended or adjusted under 35 U.S.C. 154(b) by 555 days.

(21) Appl. No.: 14/551,715

(22) Filed: Nov. 24, 2014

(65) Prior Publication Data

US 2015/0147737 A1   May 28, 2015

Related U.S. Application Data

(60) Provisional application No. 61/908,234, filed on Nov. 25, 2013.

(51) Int. Cl.
  *G09B 23/32* (2006.01)

(52) U.S. Cl.
  CPC .................................. *G09B 23/32* (2013.01)

(58) Field of Classification Search
  CPC ...................................................... G09B 23/32
  See application file for complete search history.

(56) References Cited

U.S. PATENT DOCUMENTS

| 3,766,311 A | 10/1973 | Boll |
| 3,831,434 A | 8/1974 | Greguss |
| 8,396,239 B2 | 3/2013 | Fay et al. |
| 8,841,535 B2 * | 9/2014 | Collins ............... G06F 3/04817 715/727 |
| 2010/0013612 A1 | 1/2010 | Zachman |
| 2011/0283865 A1 * | 11/2011 | Collins ............... G06F 3/04817 84/464 R |

OTHER PUBLICATIONS

Reece et al., Campbell Biology, pp. 1090-1094, 9th Edition, Pearson Education Inc., 2011.

* cited by examiner

*Primary Examiner* — Sam Yao
*Assistant Examiner* — Alvin Carlos
(74) *Attorney, Agent, or Firm* — Stradley Ronon Stevens & Young, LLP

(57) ABSTRACT

An educational system for visualizing sound by a student in a laboratory. The system includes a speaker powered by an audio amplifier. A function generator or a microphone controls the amplitude and frequency of pressure waves originating from the speaker. A model of the ear canal is suspended over the speaker, the model having a plastic pipe with two open ends and a membrane stretched taut over one of the open ends with constant tension. A mirror is affixed to the membrane, creating a mass-loaded membrane. A laser pointer emits light directed toward the mirror. A screen receives a light reflection pattern created by the light reflected from the mirror, with the model ear canal, speaker, membrane, and mirror placed equidistant between the screen and the laser pointer. The system is adapted to demonstrate hearing sensitivity to a deaf or hearing-impaired person in an educational setting.

20 Claims, 8 Drawing Sheets

VISUALIZING SOUND WITH AN ELECTRO-OPTICAL EARDRUM

RELATED APPLICATION

This application claims the benefit of priority to U.S. Provisional Patent Application Ser. No. 61/908,234, filed on Nov. 25, 2013, the contents of which are incorporated in this application by reference.

TECHNICAL FIELD

The present invention relates generally to hearing systems and, more particularly, to an electro-optical eardrum that allows the deaf or hearing-impaired to visualize sound.

BACKGROUND OF THE INVENTION

The purpose of the auditory system in mammals is to convert sound (pressure) waves into electrical signals that the brain can interpret. The human ear 1 is divided into the outer ear 10, the middle ear 20, and the inner ear 30 as shown in FIG. 1 and explained, for example, in Reece et al., *Campbell Biology* at pages 1090-94 (9th ed., Pearson Education Inc., 2011). The outer ear 10 includes the pinna 12, a curved external cartilage which "catches" sound waves and directs them into the auditory canal 14. At the end of the auditory canal 14, separating the outer ear 10 and the middle ear 20, is the eardrum 16. The eardrum 16 is also known as the tympanic membrane, is taut, and is pushed inward and outward via sound pressure waves.

The three bones of the middle ear 20 are collectively called the ossicles or the auditory ossicles. Starting proximate the eardrum 16, the bones are the malleus 22 (also known as the hammer), the incus 24 (also known as the anvil), and the stapes 26 (also known as the stirrup). The ossicles are contained within the middle ear 20 and transmit sounds from the air to the fluid-filled labyrinth called the cochlea 32, which is located in the inner ear 30 along with the semicircular canals 34. The ossicles are arranged so that movement of the eardrum 16 causes movement of the malleus 22, which causes movement of the incus 24, which causes movement of the stapes 26. The ossicles are coupled to the eardrum 16 and consequently vibrate when the eardrum 16 oscillates. All the vibrational energy of the eardrum 16 is concentrated on the much smaller surface area of the ossicles. This increases the pressure about fifteen to thirty times, thereby amplifying the sound.

Once a sound propagates through the middle ear 20, it comes to the faceplate of the stapes 26 resting against the cochlea 32, which is the starting point of the inner ear 30. Thousands of hair-like nerve cells line the length of the cochlea 32. Each hair cell has a particular resonant frequency. When the stapes 26 vibrates in the middle ear 20, it strikes the faceplate of the cochlea 32. The round window 36 is one of the two openings into the inner ear 30. The round window 36 is closed from the middle ear 20 by the round window membrane, which vibrates and moves fluid in the cochlea 32, which in turn ensures that hair cells of the basilar membrane will be stimulated. Thus, the strike of the stapes 26 sends a compression wave through the cochlea 32 and, as the wave travels, if its frequency matches with the natural frequency of any hair cells, those hair cells will resonate and vibrate with larger amplitude. This increased movement initiates nerve cells to emit electrical impulses to the brain for processing.

More specifically, the vestibulocochlear nerve has two branches: the vestibular nerve 52 and the cochlear nerve 54. The vestibular nerve 52 transmits spatial orientation information from the three semicircular canals 34 to the brain. The cochlear nerve 54 carries signals from the cochlea 32 of the inner ear 30 directly to the brain.

The middle ear 20 opens into the Eustachian tube 40, which connects to the pharynx via the opening 42 and equalizes pressure between the middle ear 20 and the atmosphere. The balance portion of the inner ear 30 includes the three semicircular canals 34. Arterial supply of blood to the ear 1 is provided, in part, through the internal carotid artery 50. The styloid bone 56 is a slender pointed piece of bone just below the ear 1. The styloid bone 56 projects down and forward from the inferior surface of the temporal bone, and serves as an anchor point for several muscles associated with the tongue and larynx.

The human ear can generally hear sounds with frequencies between 20 Hz and 20 kHz (the audio range). Although hearing requires an intact and functioning auditory portion of the central nervous system as well as a working ear 1, human deafness (extreme insensitivity to sound) most commonly occurs because of abnormalities of the inner ear 30, rather than in the nerves or tracts of the central auditory system. There are two types of deafness: conductive and sensorineural. Conductive deafness occurs when sound waves cannot enter the inner ear 30. Usually caused by physical impedance, conductive deafness can result from infection, perforation of the eardrum 16, loud noises, etc. Sensorineural deafness most commonly involves damaged hair cells, auditory nerves, or auditory processing in the brain. Sensorineural deafness can be caused by genetics, viral infections, inflammation, multiple sclerosis, and stroke.

A number of solutions have been proposed to address the problem of deafness. For example, U.S. Pat. No. 8,396,239 issued to Fay et al. discloses an optical electro-mechanical hearing device with combined power and signal architectures. An audio signal transmission device includes a first light source and a second light source configured to emit a first wavelength of light and a second wavelength of light, respectively. The first detector and the second detector are configured to receive the first wavelength of light and the second wavelength of light, respectively. A transducer electrically coupled to the detectors is configured to vibrate at least one of an eardrum or ossicle in response to the first wavelength of light and the second wavelength of light. The first detector and second detector can be coupled to the transducer with opposite polarity, such that the transducer is configured to move with a first movement in response to the first wavelength and move with a second movement in response to the second wavelength, in which the second movement opposes the first movement.

Others have addressed the problem of deafness by converting sound signals into other media. In U.S. Pat. No. 3,766,311, for example, Boll teaches a sensory substitution system. The system converts electrically coded information into selective, intelligible, localized cooling of a receptive heat-producing medium, e.g., a human body. In combination with a microphone, amplifier, and filters for producing the electrically coded information, the system enables a deaf person to perceive auditory information in the form of distinguishable localized cooling of the skin. Advantageously, the selective, localized cooling of the skin is achieved by covering a portion of the body with an apertured insulating medium and selectively gating body-produced heat through the medium. In preferred embodiments, the selective gating is achieved by a vibrating disc driven by a vibrating reed which, in turn, is driven by a piezoelectric element.

Similarly, in U.S. Patent Application Publication No. 2010/0013612, Zachman discloses an electro-mechanical system designed to help the hearing impaired. The system has a plurality of servo actuators each associated with a particular segment of a predetermined frequency domain. The servo actuators drive tactile stimulators which engage the skin of the hearing-impaired person in patterns that are unique to individual inputs thereby enabling the hearing-impaired person to "hear" signals within the defined frequency domain.

Others seek to assist the deaf by proposing methods and devices for image display of sound waves. For example, in U.S. Pat. No. 3,831,434, Greguss discloses an apparatus that uses a piezo-optic cell having a thin layer of aligned liquid crystals which is illuminated by polarized light and viewed through a polarized analyzer to give a real-time visual image in color of the acoustic wave pattern incident on the cell. The acoustic wave pattern is typically an acoustic image of an insonified object such that the resulting device is useful in non-destructive testing for industry and medicine. The acoustic wave pattern can also be the human voice (helpful in teaching speech to the deaf) and music (for pleasurable and informative visualization of the musical sound). By use of a reference acoustic wave this device may be utilized to obtain a holographic image.

Despite the existence of the devices summarized above, science educators have yet to address many of the problems that arise when attempting to teach deaf or hearing-impaired students. One of the important responsibilities for such educators is ensuring that students possess the proper tools and accommodations to examine phenomena in a laboratory setting. It is the job of the educator to innovate methods and devices that enable students with disabilities to participate in all aspects of investigations.

None of the existing devices summarized above can be used in an educational setting to demonstrate hearing sensitivity to a deaf or hearing-impaired person. To overcome the shortcomings of the existing devices, a new electro-optical eardrum is provided as part of an experimental educational system. An object of the present invention is to provide a real-time display of the sound suitable for educational applications and the like. A related object is to reproduce adequately sounds with frequencies between 20 Hz and 20 kHz (the audio range). Another object is to avoid physically contacting the student, and particularly the skin of a person, especially via a device that must be worn or carried on the person. It is still another object of the present invention to use relatively simple and inexpensive components, which fall within the limited budgets of educational institutions, while avoiding components that are complex, expensive, or both.

An introductory physics laboratory experiment at a typical university guides students through several computer simulations investigating the properties of waves and wave interference. After the simulations, students are prompted to determine the minimum and maximum frequencies they can hear using a basic function generator and headphones. Educators have inadequately addressed, to date, the problem of how they would include a deaf student in the experiment while the other students are listening to headphones to determine their personal hearing sensitivities. Therefore, a need exists to allow a student, particularly but not limited to a deaf student, to determine the hearing sensitivity of an electro-optical eardrum when unable to do so personally and without assistance.

BRIEF SUMMARY OF THE INVENTION

To meet this and other needs, and in view of its purposes, the present invention provides an electro-optical eardrum that allows the deaf to visualize sound. More particularly, in a specific embodiment of the invention an experimental accommodation allows a deaf student to determine and plot the sensitivity of an electro-optical eardrum in a particular sound range (e.g., 10-150 Hz).

The educational system for visualizing sound by a student in a laboratory, according to an embodiment of the invention, includes a speaker powered by an audio amplifier. A function generator or a microphone controls the amplitude and frequency of pressure waves originating from the speaker. A model of the ear canal is suspended over the speaker, the model having a plastic pipe with two open ends and a membrane stretched taut over one of the open ends with constant tension. A mirror is affixed to the membrane, creating a mass-loaded membrane. A laser pointer emits light directed toward the mirror. A screen receives a light reflection pattern created by the light reflected from the mirror, with the model ear canal, speaker, membrane, and mirror placed equidistant between the screen and the laser pointer. The system is adapted to demonstrate hearing sensitivity to a deaf or hearing-impaired person in an educational setting.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
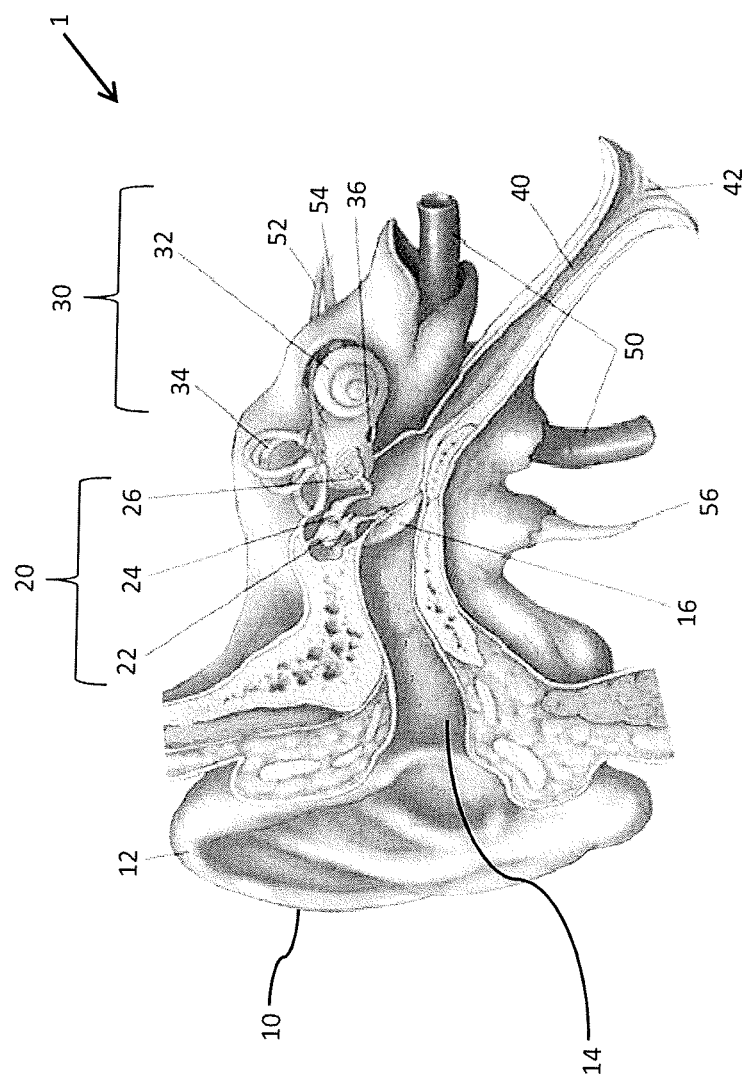
FIG. 1 illustrates the human auditory system.
Figure 2A:
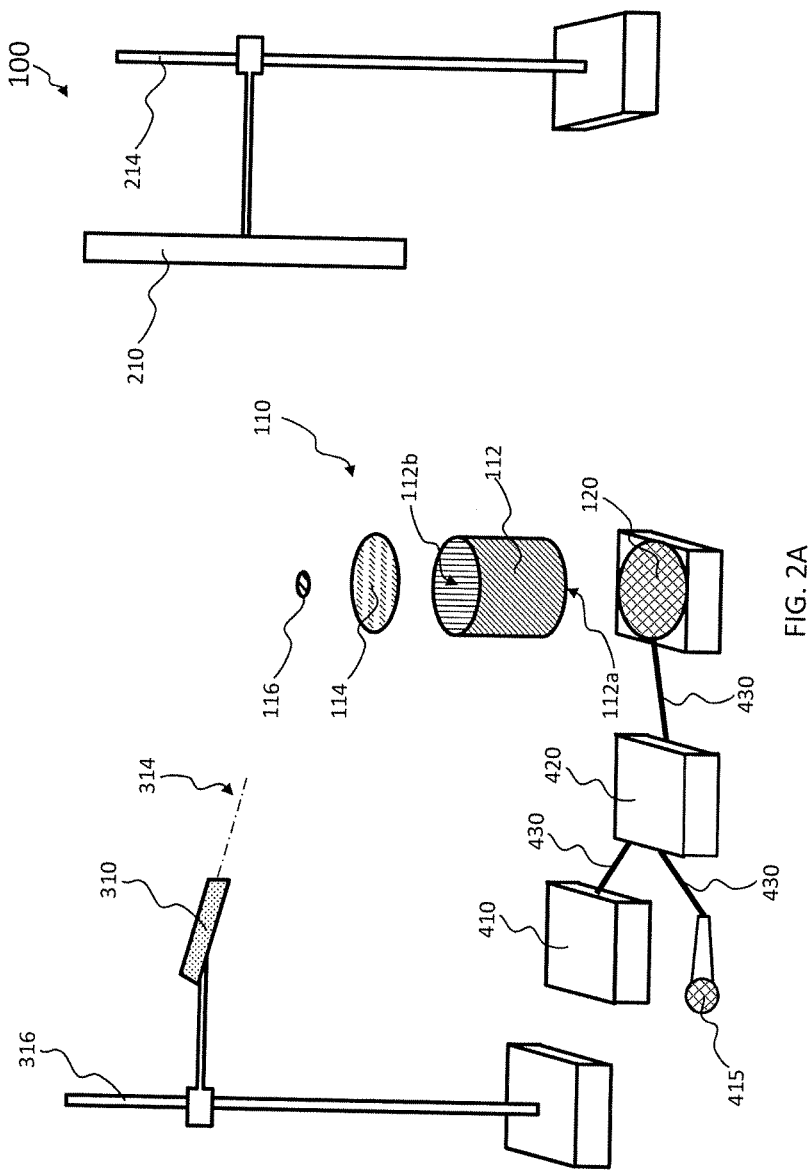
FIG. 2A illustrates an experimental system for visualizing sound with an electro-optical eardrum including an exploded view of an ear canal model, according to one exemplary embodiment of the present invention.

Referring now to the drawing, in which like reference numbers refer to like elements throughout the various figures that comprise the drawing, FIG. 2A shows a system 100 for conducting experiments including visualizing sound with an electro-optical eardrum, according to one exemplary embodiment of the present invention. A model 110 of an ear canal is placed over a speaker 120. The speaker 120 may be a subwoofer, i.e., a woofer, or a complete loudspeaker, which is dedicated to the reproduction of low-pitched audio frequencies known as bass.

Although various models of the ear canal are suitable, the model 110 of FIG. 2A includes a pipe 112 with a first open end 112a proximate to the speaker 120 and a second open end 112b opposite the first open end 112a to model the ear canal. The pipe 112 may be, for example, a plastic pipe typically used to convey drinking water, waste water, chemicals, heating fluid and cooling fluid, foodstuffs, ultra-pure liquids, slurries, gases, and compressed air and in vacuum system applications. The pipe 112 is preferably polyvinyl chloride (PVC).

Figure 2B:
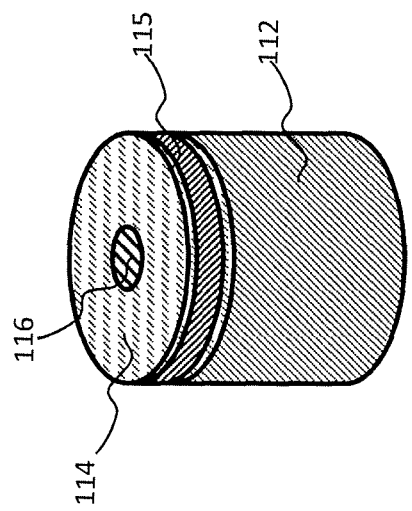
FIG. 2B illustrates a non-exploded view of the ear drum model of FIG. 2A, according to one exemplary embodiment of the present invention.

As shown in FIGS. 2A and 2B, a membrane 114 (which may be an exercise resistance band) is stretched over the second open end 112b of the pipe 112 with constant tension. The membrane 114 may be held in place by any typical fastening element such as a hose clamp 115. FIG. 2A depicts the model 110 in an exploded view; FIG. 2B depicts the membrane 114 held in place by the hose clamp 115.

A reflective surface is formed on the center of the membrane 114. In one embodiment, the reflective surface is a small circular mirror 116 delicately attached to the membrane 114, for example by glue, effectively creating a mass-loaded membrane. As described below, the reflective surface may alternatively include a reflective silver surface painted on the membrane 114.

The model 110, the speaker 120, the membrane 114, and the mirror 116 are placed equidistant between a screen 210 and a laser pointer 310. The laser pointer 310 may emit a light 314, for example, a red light. The light 314 from the laser pointer 310 is directed at the mirror 116 and reflected on to the screen 210. The screen 210 may be supported by, and can be positioned in space using, a first stand 214, such as a ring stand. Similarly, the laser pointer 310 may be supported by, and can be positioned in space using, a second stand 316. The spatial arrangement of the mirror 116, the screen 210, and the laser pointer 310 is described in greater detail below in conjunction with FIG. 4.

The system 100 further includes a sound signal-producing device such a function generator 410 in communication with the speaker 120, the output of which allows the user to control the amplitude and frequency of pressure waves originating from the speaker 120. The laser pattern seen on the screen 210 depends on the mode that the pressure wave of the speaker 120 produces on the mass-loaded membrane 114. The output of the function generator 410 is sent to an audio amplifier 420 powering the speaker 120. Alternatively, a microphone 415 can be connected to the audio amplifier 420. In other embodiments, any other suitable sound signal producing device may be connected to the audio amplifier 420. Although a wireless connection between the audio amplifier 420 and the speaker 120 is possible, wires 430 connect the audio amplifier 420 to the speaker 120 in the embodiment illustrated in FIG. 2. Wires 430 may also connect the function generator 410 and/or the microphone 415 to the audio amplifier 420, or they may be connected wirelessly.

Figure 5:
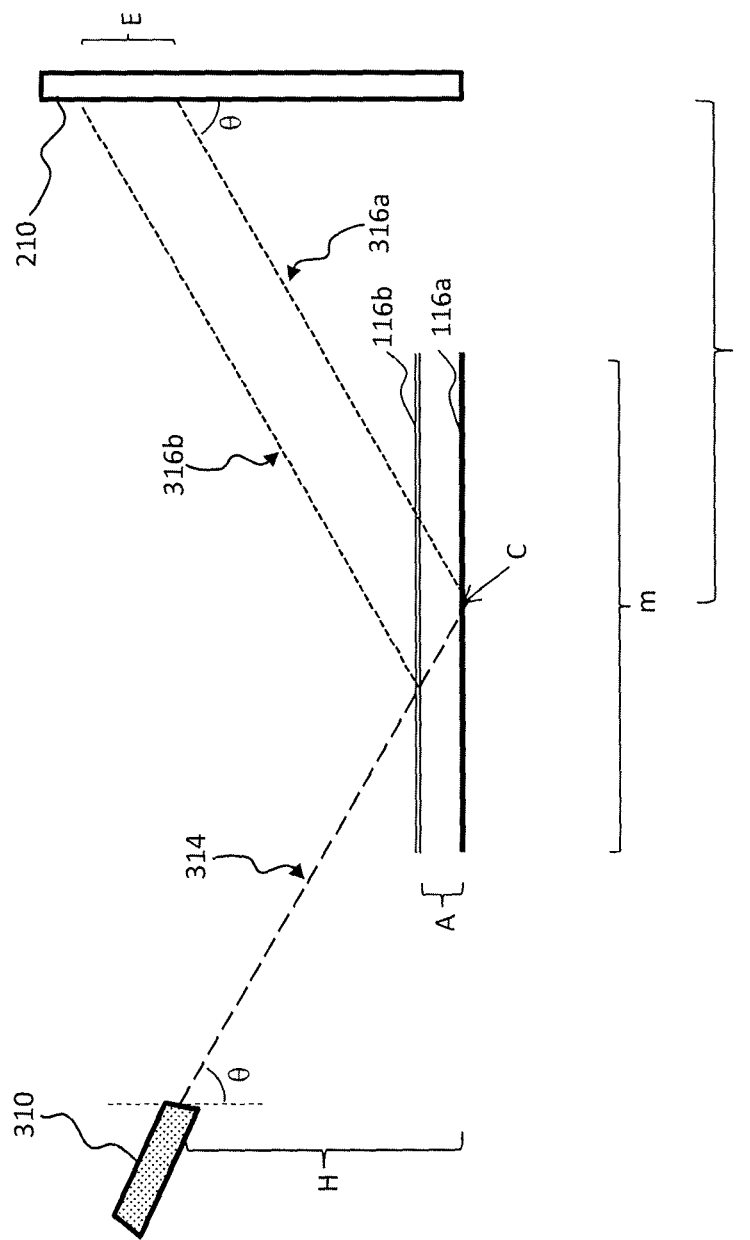
FIG. 5 illustrates Mode (0, 1) light reflection using the experimental system shown in FIGS. 2A and 2B, according to one exemplary embodiment of the present invention.
Figure 6:
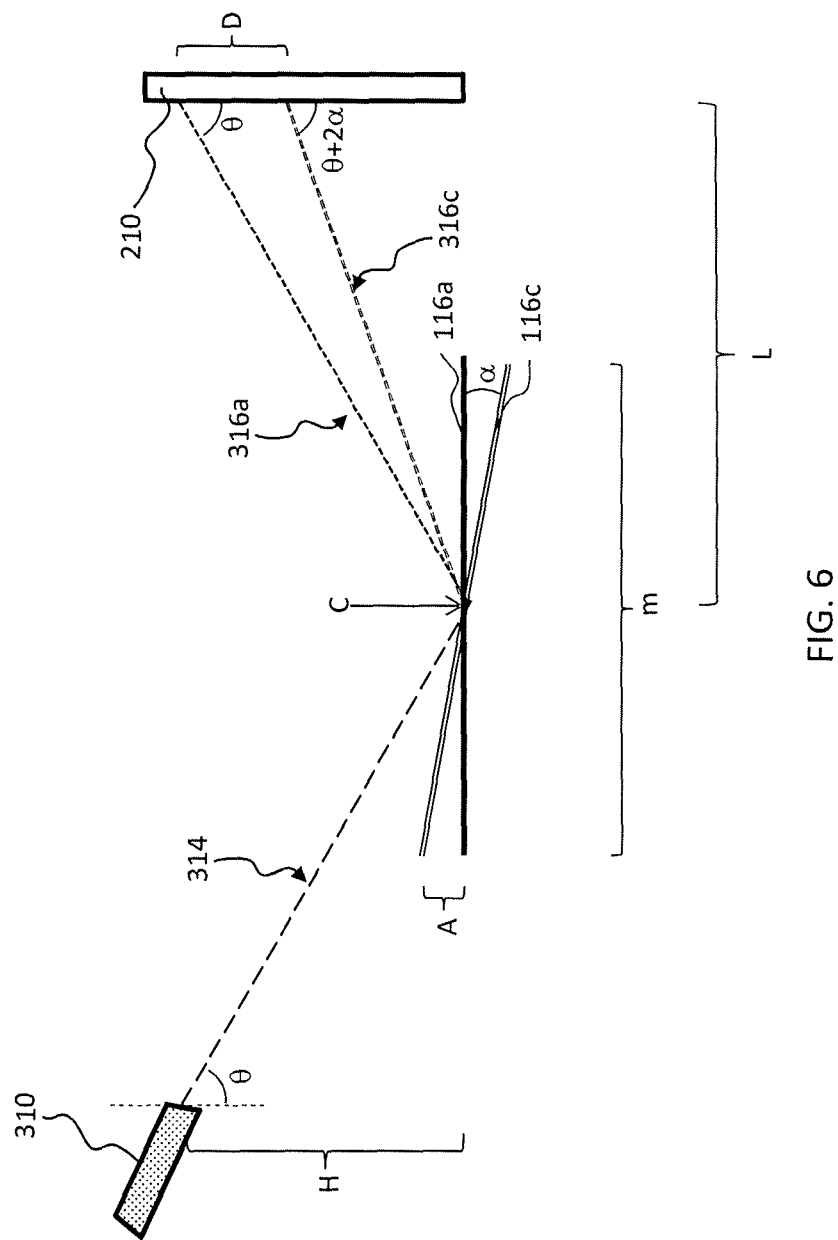
FIG. 6 illustrates Mode (1, 1) light reflection using the experimental system shown in FIGS. 2A and 2B, according to one exemplary embodiment of the present invention.

The system 100 can produce at least two circular membrane modes based on the amplitude and frequency of pressure waves originating from the speaker 120: Mode (0, 1) and Mode (1, 1). Modes are classified as Mode (m, n) with "m" as the number of nodal diameters and "n" as the number of nodal circles where there is no displacement. As illustrated in the top left image of FIG. 3, Mode (0, 1) contains one large anti-node at the center of the membrane 114 effectively raising and lowering the mirror 116 and never changing its orientation (as shown in FIG. 5). As illustrated in the top right image of FIG. 3, Mode (1, 1) contains a nodal diameter with one circular node along the edge of the membrane 114. This causes the mirror 116 to change orientation in a "see-saw" like pattern which changes the surface normal angle of the mirror 116 (as shown in FIG. 6).

Figure 3:
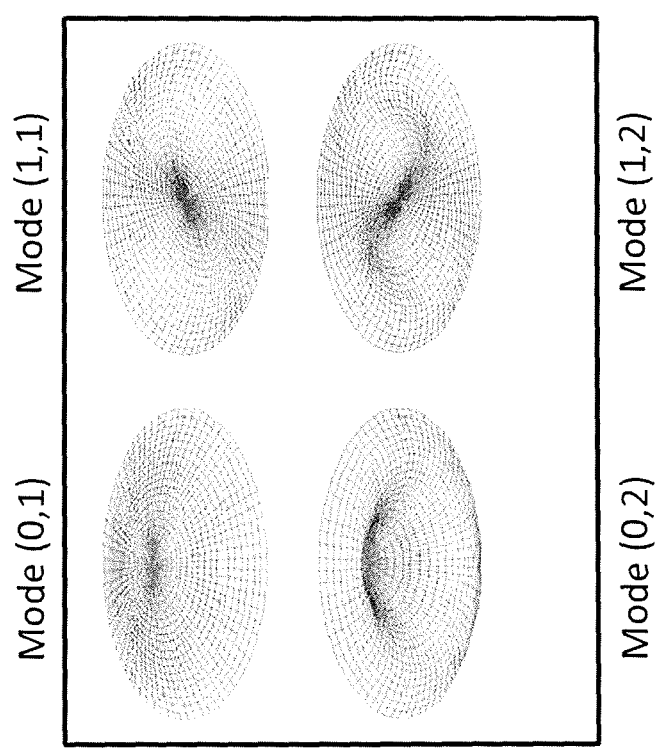
FIG. 3 illustrates circular membrane modes generated using the experimental system shown in FIGS. 2A and 2B, according to one exemplary embodiment of the present invention.

When the surface normal angle of the mirror 116 changes, the direction of the light ray path also changes by that same angle. Therefore, the vertical height of the laser or light reflection pattern on the screen 210 is the range of motion for the membrane 114. To increase the magnification of the range of motion, the mirror-to-screen horizontal distance can be increased. If the laser pattern is not vertical due to the see-saw effect of the mirror 116 not aligning with the direction of the light ray path, the pipe 112 contains a slip union allowing the pipe 112 to rotate and re-align the mirror 116. There is no volume displacement in Mode (1, 1) likely causing little to no movement of the ossicles in a real ear, but for the purpose of the system 100 as an educational tool any movement of the membrane 114 is used to simulate hearing. In addition to Mode (0, 1) and Mode (1, 1) discussed above, Mode (0, 2) and Mode (1, 2) are also illustrated in FIG. 3 as the bottom left image and the bottom right image, respectively.

In one design of the system 100, the model 110 is attached directly to the speaker 120. The direct contact and subsequent direct transfer of energy from the speaker 120 produces several more modes on the membrane 114. Also produced is an interesting phenomenon coined "periodic mode switching." At fixed time intervals, the membrane 114 spontaneously alternates between two modes of oscillation. Without wishing to be bound thereby, it is hypothesized that a thermal hysteresis effect is the cause.

In another design of the system 100, the model 110 is suspended over the speaker 120, as shown in FIG. 2A, using, for example, a hose clamp and ring stand. With this suspended position, fewer modes are observed than the initial direct-contact system. Because the weight of the mirror 114 is the likely culprit for dampening or preventing the formation of higher membrane modes, other embodiments might use a circular mirror of less mass to view more modes or possibly replace the mirror 114 with silver paint for reflection. Other parameters that might be investigated are the effects of different pipe diameters, mirror masses, and membrane tensions on the frequency range of the system 100.

EXAMPLE

Figure 4:
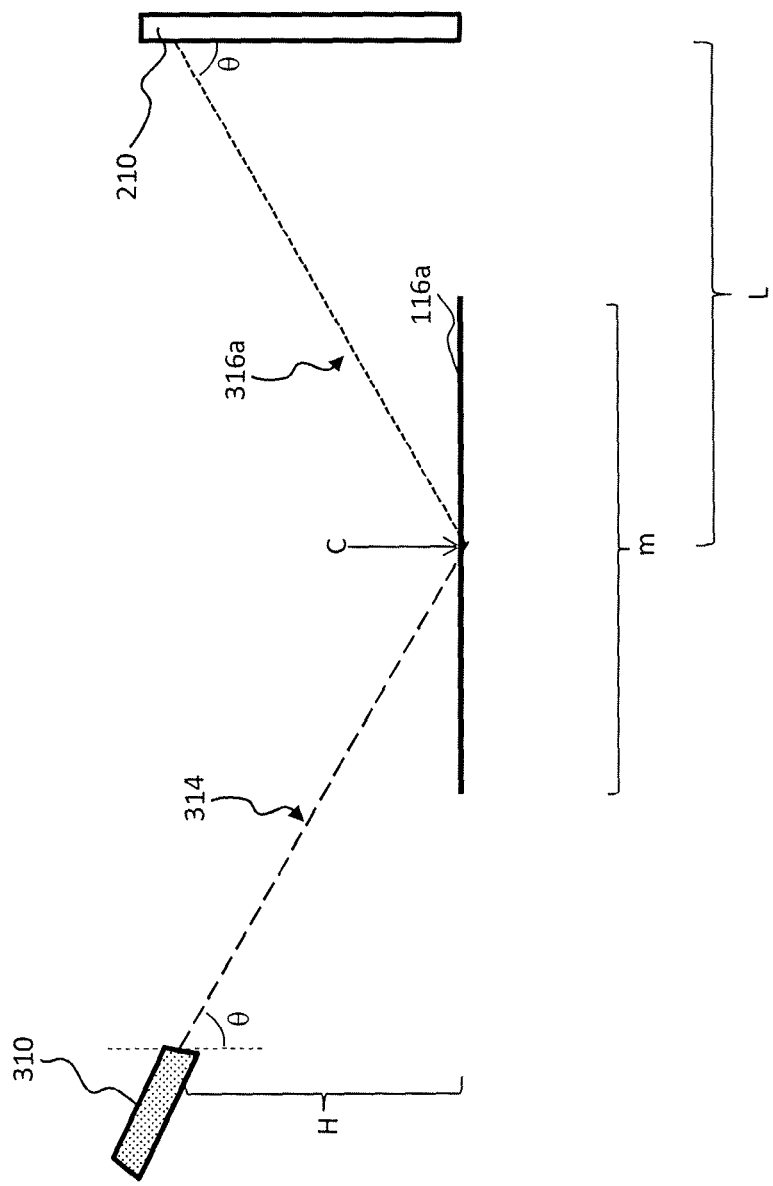
FIG. 4 illustrates light reflection using the experimental system shown in FIGS. 2A and 2B when the system is at equilibrium.

The following example is included to more clearly demonstrate the overall nature of the invention. This example is exemplary, not restrictive, of the invention. The example refers to FIGS. 4-6. In FIG. 4, the system 100 (illustrated, for example, in FIG. 2A) is depicted at equilibrium. In FIG. 5, the system 100 is depicted at the maximum amplitude of the membrane 114 (FIG. 2) when it deforms according to Mode (0, 1) (the top left image of FIG. 3). In FIG. 6, the system 100 is depicted at the maximum amplitude of the membrane 114 when it deforms according to Mode (1, 1) (the top right image of FIG. 3).

Referring to FIG. 4, the center C of the mirror 116 is placed at an equal horizontal distance L between the screen 210 and the laser pointer 310. The mirror 116 has a diameter m. The laser pointer 310 is placed at a height H above the center C of the mirror 116. The laser pointer 310 is oriented so that the light 314 emitted by the laser pointer 310 reaches the center C of the mirror 116. The angle θ of the laser pointer 314 is defined as the angle between the path of the light 314 and a vertical line intersecting the path of the light 314 and will vary based on the height H and the distance L. As used in this document, "vertical" and "horizontal" refer to the orientation of the figures. A person of ordinary skill in the art will understand that the system 100 (FIG. 2A) will function equally well in any orientation. Before the output of the speaker 120 (FIG. 2A) is applied to the membrane 114, the mirror 116 occupies a first position 116a at equilibrium. In the first position 116a, the mirror 116 is in a substantially horizontal position so that light 314 reflects off the mirror 116 and forms a first reflected beam 316a which intersects with the screen 210 at the same angle θ as the angle between the path of the light 314 and a vertical line intersecting the path of the light 314.

Referring to FIG. 5, as a result of the membrane 114 entering Mode (0, 1), the mirror 116 moves upward into a second position 116b. At the maximum amplitude, the mirror in the second position 116b is still substantially horizontal but at a height above the first position 116a equal to the amplitude A. Because the raised position of the mirror 116 results in the light 314 reflecting off the mirror 116 at a point offset from the center C, a second reflected beam 316b intersects the screen 210 at the same angle θ but at a height E above the intersection of the first beam 316a and the screen 210. If the membrane 114 produces Mode (0, 1), the user measures the height E to obtain the membrane amplitude A, which is equal to half the height E (i.e., E=2A).

Referring to FIG. 6, the membrane 114 (FIG. 2A) is oscillating based on the output of the speaker 120 (FIG. 2A) in the Mode (1, 1) (see the top right image of FIG. 3) so that the mirror 116 changes orientation in a "see-saw" like pattern about the center C of the mirror 116 between the first position 116a at equilibrium and a third position 116c. At the greatest amplitude of the oscillation, the mirror 116 occupies the third position 116c, where the end of the mirror 116 deflects by an amplitude A, resulting in a third reflected beam 316c. The angle between the mirror 116 in the first position 116a and the mirror in the third position 116c is defined as α. As a result of the deflection of the mirror 116, the third reflected beam 316c intersects the screen 210 at a distance D below the intersection of the first beam 316a and the screen 210 and at an angle equal to θ+2α.

For Mode (1, 1), the user calculates the amplitude A by measuring the distance D, incorporating the system constants (defined above), and applying Equation (1) below to calculate A.

$$A = \frac{1}{4}\left(\frac{mD\tan\theta}{H\sec^2\theta - D}\right) \quad \text{(Equation 1)}$$

In an exemplary embodiment, the physical properties of the membrane 114 suitable for use in the system 100 include a radius of about 5.8 cm, a mass density of about 0.020 g/cm², and a thickness of about 0.011 cm. The horizontal distance L between the mirror 116 and the screen 210 is about 100 cm. The height H from the center C of the mirror 116 to the center of the laser pattern on the screen 210 is about 28 cm. The angle θ of the laser pointer 310 is about 60 degrees. And the diameter m of the mirror 116 is about 5 cm. For purposes of this example, these numbers are constant for the system 100. Although these constants are used in the following calculations, a person of ordinary skill in the art will understand that these values may vary for different systems and understand how to adjust the following calculations accordingly. Because m, θ, and H are held constant, Equation (1) simplifies, using the system constants, to approximately:

$$A = 2.17 \times D/(112 - D) \quad \text{(Equation 2)}$$

The largest distance D measured for a system having the above properties was never as large as 112 cm, making Equation (2) continuous for the range of D values. Equation (2) can be used with introductory students so they are not discouraged by the relative complexity of Equation (1). The given system constants were chosen to yield values for the distance D which range from 1.0 to 20 cm and which correspond to membrane amplitudes of 0.5 to 6.5 mm. The derivation of Equation (1) uses only the law of reflection, geometry, and basic trigonometry.

With reference to FIGS. 4 and 6, Equation (1) can be derived as follows.

$$\tan\alpha = \frac{A}{\frac{1}{2}m} \quad \text{(Equation 3)}$$

$$\tan\alpha = \frac{2A}{m} \quad \text{(Equation 4)}$$

$$\tan\theta = \frac{L}{H} \quad \text{(Equation 5)}$$

$$\tan(\theta + 2\alpha) = \frac{L}{H - D} \quad \text{(Equation 6)}$$

$$(H - D)\tan(\theta + 2\alpha) = H\tan\theta \quad \text{(Equation 7)}$$

$$(H - D)\left(\frac{\tan\theta + \tan 2\alpha}{1 - \tan 2\alpha \tan\theta}\right) = H\tan\theta \quad \text{(Equation 8)}$$

$$(H - D)\left(\frac{\tan\theta + \frac{4A}{m}}{1 - \frac{4A}{m}\tan\theta}\right) = H\tan\theta \quad \text{(Equation 9)}$$

$$\left(\frac{(H - D)\tan\theta + \frac{4A}{m}(H - D)}{1 - \frac{4A}{m}\tan\theta}\right) = H\tan\theta \quad \text{(Equation 10)}$$

$$(H - D)\tan\theta + \frac{4A}{m}(H - D) = H\tan\theta - \frac{4A}{m}H\tan^2\theta \quad \text{(Equation 11)}$$

$$\frac{4A}{m}(H - D) + \frac{4A}{m}H\tan^2\theta = H\tan\theta - (H - D)\tan\theta \quad \text{(Equation 12)}$$

$$\frac{4A}{m} = (H + H\tan^2\theta - D) = D\tan\theta \quad \text{(Equation 13)}$$

$$\frac{4A}{m} = \frac{D\tan\theta}{(H + H\tan^2\theta - D)} \quad \text{(Equation 14)}$$

$$A = \frac{1}{4}\left(\frac{mD\tan\theta}{H\sec^2\theta - D}\right) \quad \text{(Equation 1)}$$

The hearing sensitivity of an individual can be determined by a simple test. First, a reference tone at a specific frequency and loudness level is chosen. Next, the frequency is changed from the reference but the loudness level is kept constant. The individual then relays if the new sound is perceived as of equal, higher, or lower loudness than the reference tone. If the loudness at this new frequency is not perceived equal, the loudness level is changed until the individual perceives the new frequency tone as the same loudness level as the reference. From this collected data, the hearing sensitivity of an individual can be plotted on a graph of frequency versus equal loudness. The graph displays the individual's perceived equal loudness contours at different frequencies.

The system 100 gives a hearing-impaired student or another person the ability to create a simple plot of hearing sensitivity. The first step is to determine a fixed membrane amplitude value (also known as a "reference tone"). A membrane amplitude value of 1.0 mm, which corresponds to a distance D of 2.5 cm or a laser pattern total height of 5.0 cm, was used in the original experiment. The user determines the lowest frequency to which the membrane 114 responds with this predetermined amplitude while at maximum power. Next, the user increases the frequency (5 Hz increments are suggested) and changes the speaker power (also known as the "loudness level") until the system 100 responds with the same predetermined amplitude. This process is repeated for the entire frequency range of the system 100 while recording frequency and speaker power. These steps to determine the range of hearing for the electro-optical eardrum simulate playing tones of equal loudness to determine a person's range of hearing.

Figure 7:
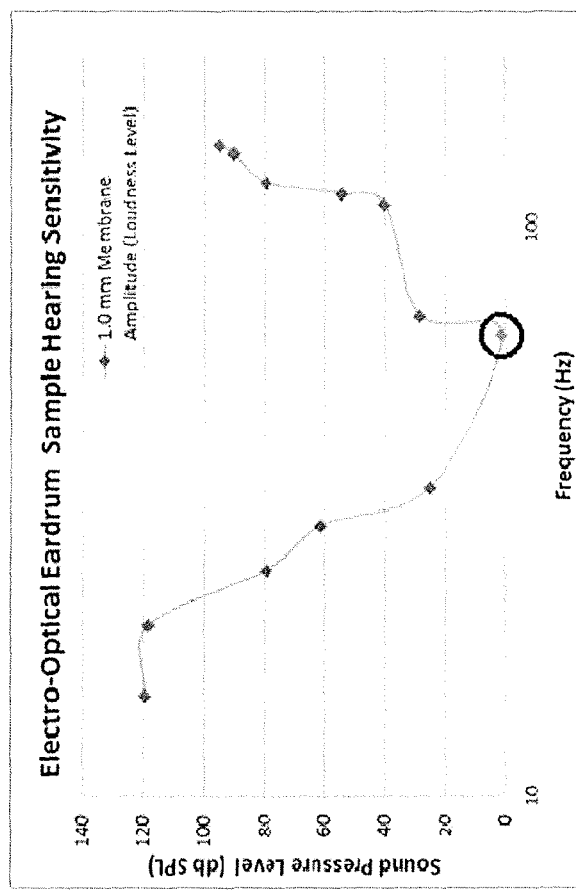
FIG. 7 is a sample hearing sensitivity graph produced by the system shown in FIGS. 2A-2B, according to one exemplary embodiment of the present invention.

The lowest speaker power recorded is used as a reference value for the calculation of a re-normalized sound pressure level (SPL) data set. The power values are re-normalized based on the sound frequency to which the membrane 114 responds with minimum effort (minimum power). To re-normalize the data, simply divide all of the power values by the lowest speaker power value. To obtain a graph of hearing sensitivity, the user plots the re-normalized SPL data set versus the frequency data set. FIG. 7 shows a sample hearing sensitivity graph produced by the system 100, which is an analog to the hearing sensitivity of a human being. The connecting line does not represent any specific fit of the data. The data point representing the lowest speaker power is shown as the circled diamond.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A system for visualizing sound by a student in a laboratory, the system comprising:
    a speaker powered by an audio amplifier;
    a sound signal-producing device controlling the amplitude and frequency of pressure waves originating from the speaker;
    a model of an ear canal placed over the speaker, the model including a pipe with a first open end proximate to the speaker and a second open end opposite the first open end with a membrane stretched taut over the second open end with constant tension and a reflective surface on the membrane;
    a laser pointer emitting light directed toward the reflective surface; and
    a screen receiving a light reflection pattern created by the light reflected from the reflective surface, with the model of the ear canal placed equidistant between the screen and the laser pointer,
    wherein the system is adapted to demonstrate hearing sensitivity to a deaf or hearing-impaired person in an educational setting.

2. The system of claim 1, wherein the speaker is a subwoofer.

3. The system of claim 1, wherein the speaker is a complete loudspeaker.

4. The system of claim 1, wherein the speaker, the audio amplifier, and the sound signal-producing device are connected wirelessly.

5. The system of claim 1, wherein the sound signal-producing device is a function generator.

6. The system of claim 1, wherein the sound signal-producing device is a microphone.

7. The system of claim 1, wherein the pipe comprises polyvinyl chloride.

8. The system of claim 1, wherein the reflective surface comprises a mirror glued to the membrane.

9. The system of claim 1, wherein the reflective surface comprises a reflective silver surface painted on the membrane.

10. The system of claim 1, wherein the model of an ear canal is attached directly to the speaker.

11. The system of claim 1, wherein the model of an ear canal is suspended above the speaker.

12. The system of claim 1, wherein the system can produce at least two circular membrane modes (m, n) based on the amplitude and frequency of pressure waves originating from the speaker, where m is the number of nodal diameters and n is the number of nodal circles where there is no displacement.

13. The system of claim 12, wherein the system produces at least mode (0, 1) and mode (1, 1).

14. The system of claim 13, wherein the light reflection pattern comprises a reflected beam of light oscillating between a first position at equilibrium and a second position at a height different from the first position based on the circular membrane mode of the system.

15. The system of claim 14, wherein when the membrane mode is (1, 1), the height of the light reflection pattern between the first position and the second position is equal to twice an amplitude of the membrane.

16. The system of claim 14, wherein when the membrane mode is (1, 1), the amplitude A of the membrane is equal to:

$$A = \frac{1}{4}\left(\frac{mD\tan\theta}{H\sec^2\theta - D}\right),$$

where
    m is the diameter of the reflective surface;
    θ is the angle between the path of the light of the laser pointer and a vertical line intersecting the path of the light;
    H is the height of the laser pointer above the membrane in the first position; and D is the distance between the light reflection patterns in the first position and the second position.

17. The system of claim 16, wherein m is about 5.8 cm; θ is about 60 degrees; and H is about 28 cm.

18. The system of claim 17, wherein the height of the light reflection pattern is less than 112 cm.

19. The system of claim 13, wherein when the membrane mode is (0, 1), the mirror moves vertically but remains substantially horizontal.

20. The system of claim 13, wherein when the membrane mode is (1, 1), the mirror changes orientation in a "see-saw" pattern but does not change height.

* * * * *